US009261211B2

(12) United States Patent
Schooley et al.

(10) Patent No.: US 9,261,211 B2
(45) Date of Patent: Feb. 16, 2016

(54) LATCHING MECHANISMS FOR CLAMSHELL TYPE COUPLERS

(71) Applicant: Eaton Corporation, Cleveland, OH (US)

(72) Inventors: Nicholas Clancy Schooley, Denver, CO (US); Richard Lowell Statler, III, Denver, CO (US); David Ethan Maretich, Denver, CO (US); Clifton Paul Breay, Littleton, CO (US); Jay Mack Caudill, Westminster, CO (US); Lane Charles Taber, Jr., Okemos, MI (US); Thomas Alan Kottmeier, Littleton, CO (US); Chris T. Adkins, Aurora, CO (US); Michael Alan Ritter, Superior, CO (US)

(73) Assignee: EATON CORPORATION, Cleveland, OH (US)

( * ) Notice: Subject to any disclaimer, the term of this patent is extended or adjusted under 35 U.S.C. 154(b) by 42 days.

(21) Appl. No.: 14/052,476

(22) Filed: Oct. 11, 2013

(65) Prior Publication Data

US 2015/0102600 A1 Apr. 16, 2015

(51) Int. Cl.
*F16L 25/00* (2006.01)
*F16L 23/06* (2006.01)
*F16L 25/01* (2006.01)
*F16L 27/10* (2006.01)

(52) U.S. Cl.
CPC ............... *F16L 23/06* (2013.01); *F16L 25/01* (2013.01); *F16L 27/1012* (2013.01); *F16L 27/1021* (2013.01); *F16L 2201/10* (2013.01)

(58) Field of Classification Search
USPC ............ 24/20 EE, 16 PB; 285/365, 407, 420, 285/252; 292/256.6
See application file for complete search history.

(56) References Cited

U.S. PATENT DOCUMENTS

| 3,157,932 A | 11/1964 | Kyrias |
| 3,434,191 A | 3/1969 | Timmons |
| 3,776,579 A | 12/1973 | Gale |
| 4,008,937 A | 2/1977 | Filippi |
| 4,123,095 A | 10/1978 | Stehlin |

(Continued)

OTHER PUBLICATIONS

International Search Report and Written Opinion for International Patent Application No. PCT/US14/16755, mailed May 9, 2014, 12 pages.

*Primary Examiner* — Aaron Dunwoody
(74) *Attorney, Agent, or Firm* — Sheridan Ross PC

(57) ABSTRACT

Latching mechanisms in multiple embodiments connect clamshell type couplers comprising a pair of arcuate coupling halves joined at a hinge. One embodiment includes a biased catch lever that engages a corresponding latch plate. Another embodiment includes a plurality of latching extensions that engage an opposing latching housing, along with biased locking buttons for selectively locking the mechanism. Another embodiment includes dual rotatable latching arms for interconnecting the coupling halves, each arm having a latching cam for selectively locking the mechanism. Another embodiment includes a rotatable latching arm and a receiving bracket for receiving the latching arm for selectively locking the mechanism. Another embodiment includes an over center hinge mechanism including three cooperating and rotatable latch plates. Another embodiment includes cooperating cassette mechanisms, each having connector extensions for connecting the cassette mechanisms to one another for selectively locking the mechanism. Methods are also disclosed for selectively locking the latching mechanisms.

5 Claims, 17 Drawing Sheets

(56) References Cited

U.S. PATENT DOCUMENTS

| | | | |
|---|---|---|---|
| 4,249,786 A | 2/1981 | Mahoff | |
| 4,272,871 A | 6/1981 | Weinhold | |
| 4,311,248 A | 1/1982 | Westerlund et al. | |
| 4,346,428 A | 8/1982 | Gale | |
| 4,358,879 A | 11/1982 | Magyar | |
| 4,368,563 A | 1/1983 | Lentz | |
| 4,432,759 A | 2/1984 | Gross et al. | |
| 4,438,958 A | 3/1984 | De Cenzo | |
| 4,473,369 A | 9/1984 | Lueders et al. | |
| 4,624,034 A * | 11/1986 | Ishiguro et al. | 24/641 |
| 4,697,830 A | 10/1987 | Wood et al. | |
| 4,730,850 A | 3/1988 | Takahashi | |
| 4,804,208 A | 2/1989 | Dye | |
| 4,881,760 A | 11/1989 | Runkles et al. | |
| 4,955,115 A * | 9/1990 | Tanaka | 24/641 |
| 5,015,013 A | 5/1991 | Nadin | |
| 5,123,677 A | 6/1992 | Kreczko et al. | |
| 5,188,400 A | 2/1993 | Riley et al. | |
| 5,208,953 A | 5/1993 | McFalls | |
| 5,257,439 A * | 11/1993 | LeBlanc | 24/269 |
| 5,259,690 A | 11/1993 | Legge | |
| 5,293,669 A | 3/1994 | Sampson | |
| 5,385,373 A | 1/1995 | Love | |
| 5,398,679 A | 3/1995 | Freed | |
| 5,524,672 A | 6/1996 | Mosing et al. | |
| 5,620,210 A | 4/1997 | Eyster et al. | |
| 5,936,197 A | 8/1999 | Katoh et al. | |
| 6,148,924 A | 11/2000 | Shafer | |
| 6,168,345 B1 | 1/2001 | Legge | |
| 6,470,538 B2 | 10/2002 | Richter | |
| 6,523,230 B1 | 2/2003 | Weinhold | |
| 6,523,866 B2 | 2/2003 | Lin | |
| 6,694,578 B1 | 2/2004 | Nicoll | |
| 6,880,859 B2 | 4/2005 | Breay et al. | |
| 6,951,550 B2 | 10/2005 | Bierman | |
| 6,971,413 B2 | 12/2005 | Taylor et al. | |
| 6,971,682 B2 | 12/2005 | Hoang et al. | |
| 7,014,225 B1 | 3/2006 | Goodsel et al. | |
| 7,210,201 B2 | 5/2007 | Maeckle et al. | |
| 7,290,805 B2 | 11/2007 | Wu | |
| 8,075,024 B2 | 12/2011 | Wern et al. | |
| 8,220,113 B2 | 7/2012 | Morton et al. | |
| 2005/0248098 A1 | 11/2005 | Sisk et al. | |
| 2009/0096209 A1 | 4/2009 | Zilch | |
| 2010/0253064 A1 | 10/2010 | Le Quere | |
| 2010/0327576 A1 | 12/2010 | Linhorst et al. | |
| 2011/0084476 A1 | 4/2011 | Nishida | |

\* cited by examiner

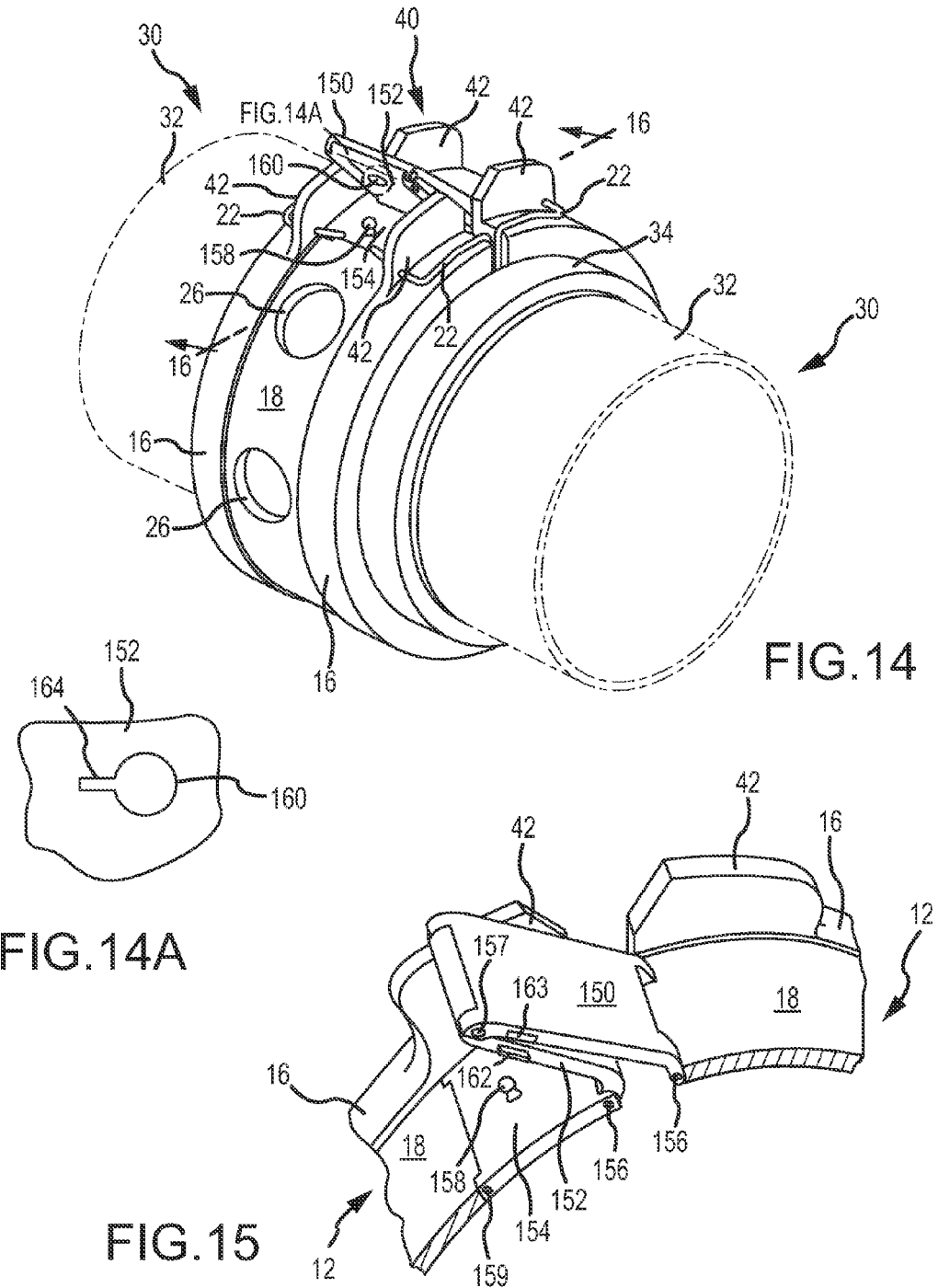

LATCHING MECHANISMS FOR CLAMSHELL TYPE COUPLERS

FIELD OF THE INVENTION

This invention relates to couplings for interconnecting a pair of confronting fluid conveying members, and more particularly, to latching mechanisms used in clamshell type couplers that interconnect fluid conveying members in a sealed relationship.

BACKGROUND OF THE INVENTION

Couplings used to interconnect fluid conveying tubes or conduits are found across many different industries, and special requirements may exist in each industry to address a number of standards. Many of the standards involve safety requirements to ensure the coupling creates a fluid tight seal across the facing ends of the tubes or conduits. For fluid conveying tubes that convey fuel, there is always a concern in the design of couplings to ensure that the design can provide means to dissipate electrostatic charges that will build up between insulated sections of the coupled tubes/conduits. A stored electrostatic charge may give rise to an electrical spark hazard in the presence of vaporized fuel. Discharge of the spark by grounding or by flexing of the coupling in such a manner to bring metallic parts of the coupling into contact with another may cause an instantaneous combustion of any vaporized fuel present at the time, which in turn can cause ignition of the fuel conveyed in the tubes. Other causes of potential ignition include lightning strikes. Therefore, one requirement for a coupling may be to provide the capability to dissipate both dynamic and static electrical charges.

One solution incorporated in couplings is to provide an electrical jumper, also referred to as a bonding jumper, to eliminate the hazard of differential electrostatic charges. In short, a bonding jumper provides an electrically conductive connection between coupled sections of a tube or conduit to prevent build up of electrostatic charges. Electrical jumpers may be exteriorly or interiorly mounted. Exteriorly mounted jumpers may include a piece of flexible conductive metal or cable that is detachably secured to the metallic flanges or ferrules of the facing ends of the tubes. Interiorly mounted jumpers may include leaf-spring type constructions mounted within the coupling and placed in contact with the flanges or ferrules forming the ends of the fluid conveying members to be connected.

As designs of couplings have progressed, other improvements have been incorporated within these designs to address various performance standards. Particularly for fluid conveying conduits that convey flammable liquids and installed within constrained spaces, some coupling designs have been developed to ease a user's manipulation of the coupling for connecting and disconnecting the adjacent tubes/conduits. However, despite certain improvements, there is still a need to provide a coupling design that maximizes not only the certainty that the coupling can be easily and consistently latched or locked, but also that the coupling design is of a lightweight yet robust construction capable of withstanding loading conditions where the coupling is installed.

One type of construction for a coupling includes a two-piece "clamshell" coupling in which two coupling members or halves are connected to one another about a hinge, and a latching mechanism is used to lock the coupling over connected fluid conveying members. One example of such a clamshell type coupler includes the U.S. Pat. No. 8,075,024. This reference more specifically discloses a coupling assembly for interconnecting fluid conveying members each having a ferrule captured within the coupler, along with a sleeve that circumferentially surrounds the ferrules. A bonding wire construction is provided to electrically bond the respective coupling members to the ferrules of the fluid conveying members. A releasable latching mechanism is configured to releasably secure the ends of the coupling members in a closed or locked position.

Another example of a clamshell type coupler includes the U.S. Pat. No. 6,880,859. This particular reference also discloses a coupler especially adapted for connecting confronting ends of fluid conveying members each having ferrules with annular sealing O-rings, and a sleeve that circumferentially surrounds the ferrules. This reference more specifically discloses a particular construction for an externally mounted bonding wire and a redundant latching mechanism.

Despite the numerous designs known for coupling devices, there is still a need to provide a coupling device that adopts important safety features, yet is easily and reliably manipulated by a user.

SUMMARY OF THE INVENTION

In accordance with embodiments of the invention, latching mechanisms are provided for releasably and selectively locking and unlocking connecting clamshell type couplers. A clamshell coupler may be defined as one that includes a pair of arcuate coupling halves joined at a hinge. The coupling halves may be rotated toward one another at their free ends to place the coupler in a closed or locked position to join confronting ends of a pair of fluid conveying members. The coupling halves extend circumferentially around the abutting ends of the fluid conveying members to be joined and sealed to one another. Typically, the ends of the fluid conveying members include metallic flanges or ferrules. The distal ends of the flanges or ferrules each have a groove formed in the ferrule to receive a sealing member in the form of an O-ring. The O-ring is sealed against the interior surface of a sleeve that is also captured within the coupling halves. An electrical or bonding jumper may be provided on each coupling half, such as a continuous length of a wire or a conductive braided material that spans the coupling halves and provides multiple points of contact with both flanges/ferrules of the fluid conveying members. The bonding jumpers are also positioned in contact with the group of components or assembly that couple the coupling halves to one another, referred to herein as a latching mechanism. Multiple points of contact of the bonding jumper at various locations along the coupling ensure adequate electrical conductivity across the coupling, thereby preventing electrostatic buildup. For bonding jumpers that are exteriorly mounted, these have an advantage in that they are easily inspected without having to disassemble or remove of the coupling or latching mechanism. This type of bonding jumper may also be integrally designed with the latching mechanism, and therefore, no additional steps are required to secure the bonding jumper in order to place the coupling in operation.

Embodiments of the invention include differing types of latching mechanisms for releasably and sealingly connecting the abutting ends of the fluid conveying members. In a first embodiment, the latching mechanism includes a biased catch lever that connects with a corresponding latch plate. In a second embodiment, the latching mechanism includes a plurality of latching extensions or tongues that connect with a latching housing, with biased locking buttons for locking and unlocking the coupling. In a third embodiment, the latching mechanism includes dual rotatable latching arms for interconnecting the coupling halves, each of the latching arms having a corresponding latching cam for selectively locking and unlocking the latching mechanism. In a fourth embodiment, the latching mechanism includes a karabiner-type locking mechanism having a rotatable latching arm and a receiving bracket for receiving the latching arm when the latching mechanism is placed in the locked position. In a fifth embodiment, the latching mechanism includes an over-center hinge mechanism having three cooperating and rotatable latch plates. In this fifth embodiment, first and second latch plates interconnect the free ends of the coupling halves, and the first and second latch plates are rotatable over a third latch or base plate. The base plate includes a locking ball received in a corresponding opening in the second latch plate for locking the latching mechanism. In a sixth embodiment, the latching mechanism includes cooperating cassette mechanisms, each having connector extensions for connecting the cassette mechanisms to one another, thereby closing and locking the coupling. The connector extensions each include a distal tab received through an opposing and adjacent slot of the opposing cassette mechanism. The connector extensions are angularly oriented such that they are slightly bent and therefore biased upon insertion within the opening in the opposing cassette mechanism. In this manner, the tabs can be locked within the adjacent slots. Downward pressure placed on the tabs and simultaneously pulling apart the coupling halves enables the cassette mechanisms to be separated from one another, thereby unlocking the latching mechanism.

In addition to the latching assemblies, each of the embodiments may be supplemented with a secondary latch mechanism or latch indicator that is used to verify that the latch mechanism has properly been placed in a locked position. More specifically, the latch indicator serves as both a visual and tactile indicator for verification that the coupling is properly installed and secured over the interconnected fluid conveying members. The geometric arrangement of the latch indicator, as it is mounted on the coupling, is such that it can only be moved to its fully closed position when the latching mechanism is completely and properly locked. The latch indicator is easily visually inspected to confirm that it placed in its fully closed position during use. Further, a latching projection of the latch indicator provides an audible and tactile "snap" or "click" signifying that the latch mechanism has been placed in its fully locked position. The latch indicator also serves as a protective cover over the latch mechanism to prevent contact with the latch mechanism that could result in inadvertent unlocking of or damage to the latch mechanism.

Considering the above features of the invention, it may therefore be considered in one aspect, a latching mechanism for selectively locking and unlocking a coupling used to interconnect ends of two fluid conveying members, said latching mechanism comprising: (i) a catch lever rotatably mounted to a first coupling member of said coupling, said catch lever having a distal end and an extension protruding from said distal end; (ii) a spring communicating with said catch lever for biasing said catch lever and urging said distal end of said catch lever toward the first coupling member; (iii) a latch plate rotatably mounted to a second coupling member of said coupling, said latch plate extending across a gap between facing surfaces of said first and second coupling members when said coupling is placed in a closed position about said fluid conveying members; and (iv) said latch plate further including an opening formed therein for receiving said extension of said catch lever when said latching mechanism is placed in a locked position, and said latching mechanism placed in an unlocked position, when said extension is removed from within said opening.

In another aspect of the invention, it may be considered a latching mechanism for selectively locking and unlocking a coupling used to interconnect ends of two fluid conveying members, said latching mechanism comprising: (i) a base mounted to a first coupling member of said coupling; (ii) a tongue extending from said base towards a second coupling member of said coupling; (iii) a latching housing mounted to said second coupling member, said latching housing having an opening for receiving said tongue, said latching housing further including a locking button attached to said latching housing, and a biased catch member communicating with said locking button; and (iv) wherein said tongue extends across a gap between facing surfaces of said first and second coupling members when said coupling is placed in a closed position about said fluid conveying members, said latching mechanism placed in a locked position by placing said tongue through said opening of said latching housing and contacting said biased catch member, said latching mechanism placed in an unlocked position by pressing said locking button and simultaneously removing said tongue from within said latching housing.

In yet another aspect of the invention, it may be considered a latching mechanism for selectively locking and unlocking a coupling used to interconnect ends of two fluid conveying members, said latching mechanism comprising: (i) an inner latching arm rotatably mounted to a first coupling member of said coupling; (ii) an outer latching arm rotatably mounted to a second coupling member of said coupling; (iii) said inner latching arm and said outer latching arm extending across a gap between facing surfaces of said first and second coupling members when said coupling is placed in the closed position; (iv) an inner latching cam communicating with said inner latching arm, said inner latching cam being rotatable between a first position and a second locked position; and (v) an outer latching cam communicating with said outer latching arm, said outer latching cam being rotatable between a first position and a second locked position.

In yet another aspect of the invention, it may be considered a latching mechanism for selectively locking and unlocking a coupling used to interconnect ends of two fluid conveying members, said coupling including first and second coupling members, said latching mechanism comprising: (i) a latching arm rotatably mounted to a first coupling member of said coupling, said latching arm having a biased movable bushing mounted thereto, and a head mounted distally of said bushing on said latching arm, said latching arm extending across a gap between facing surfaces of said first and second coupling members when said coupling is placed in a closed position about said fluid conveying members; (ii) a bracket mounted to said second coupling member of said coupling, said bracket having a slot for receiving said distal end of said latching arm; and (iii) wherein said latching arm is rotatable towards said bracket, said latching arm having a portion thereof inserted in said slot of said bracket by retracting said movable bushing towards a proximal end of said latching arm and fully rotating said latching arm so that said movable bushing clears said bracket, said latching mechanism being placed in a locked position when said latching arm is inserted within said slot of said bracket and said movable bushing is released to contact said bracket.

In yet another aspect of the invention, it may be considered a latching mechanism for selectively locking and unlocking a coupling used to interconnect ends of two fluid conveying members, said coupling having first and second coupling members, said latching mechanism comprising: (i) a first latch plate having a first end rotatably connected to said first coupling member; (ii) a second latch plate having a first end rotatably connected to said second coupling member, an opening formed on said second latch plate, and said first and second latch plates being rotatably connected to one another at respective second ends; (iii) a base plate mounted to said second coupling member, said base plate having a locking element extending therefrom and cooperating with said opening formed on said second latch plate; and (iv) wherein in an unlocked position of said latching mechanism, said first ends of said first and second latch plates are separated from one another thereby expanding a gap between facing surfaces of said first and second coupling members, and wherein to place said latching mechanism in a locked position, said first ends of said latch plates are drawn toward one another and are simultaneously folded over said base plate such that said locking element is inserted within said opening of said second latch plate.

In yet another aspect of the invention, it may be considered a latching mechanism for selectively locking and unlocking a coupling used to interconnect ends of two fluid conveying members, said coupling having first and second coupling members, said latching mechanism comprising: (i) a first cassette connector mounted to said first coupling member, said first cassette connector having a main body, an opening, a receiving slot communicating with said opening, and a connector extension extending away from said main body adjacent said opening; (ii) a second cassette connector mounted to said second coupling member, said first cassette connector having a main body, an opening, a receiving slot communicating with said opening, and a connector extension extending away from said main body adjacent said opening; and (iii) wherein when said first and second coupling members are placed in a closed position, said connector extensions each have distal ends that extend toward an opposing cassette connector and aligned with the opening of the opposing cassette connector, such that placing the latching mechanism in a locked position includes inserting the distal ends of the connector extensions through the corresponding openings and locating the distal ends of the connector extensions within the corresponding slots of the cassette connectors, and wherein placing the latching mechanism in an unlocked position includes depressing the distal ends of said connector extensions and pulling the first and second coupling members apart from one another, thereby removing the connector extensions from within the corresponding slots and openings of the respective cassette connectors.

Additional features and advantages of the invention will become apparent from a review of the detailed description, taken in conjunction with the accompanying drawings.

BRIEF DESCRIPTION OF THE DRAWINGS

For the detailed description and the accompanying drawings that follow, like parts are indicated throughout the drawings and description with the same reference numerals. The figures are not necessarily drawn to scale, and certain parts or portions of elements illustrated may have been exaggerated for convenience of illustration.

FIG. 14 is a perspective view of the clamshell type coupler and latching mechanism of the invention in a fifth embodiment with the coupler in the coupled or closed position;

FIG. 14A is a greatly enlarged fragmentary view of a portion of a latch plate of the fifth embodiment illustrating the shape of an opening and adjacent slot for receiving a locking ball of a base plate;

FIG. 15 is a greatly enlarged fragmentary perspective view of the coupler and the latching mechanism of the fifth embodiment illustrating additional details of the latching mechanism;

DETAILED DESCRIPTION

Figure 1:
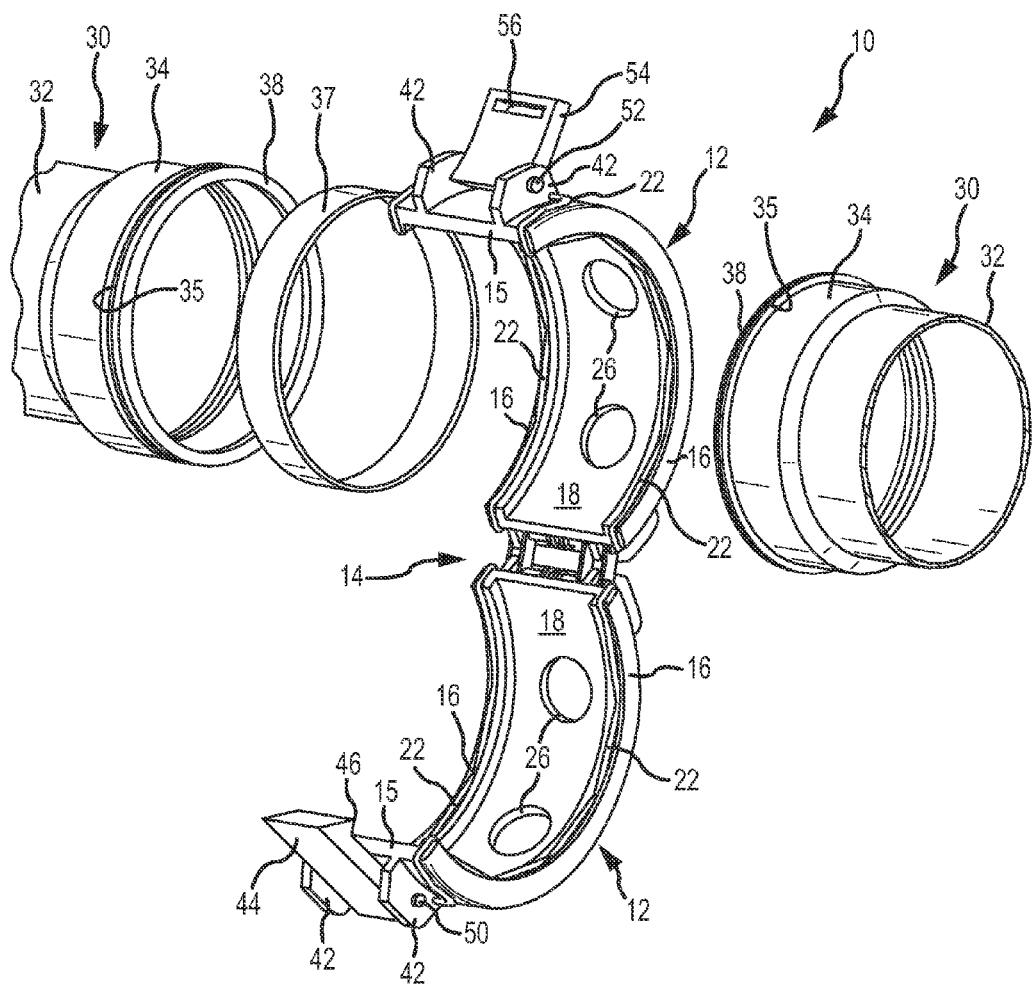
FIG. 1 is a perspective view of a clamshell type coupler and a latching mechanism of the invention in a first embodiment with the coupler in an uncoupled or open position. This figure further illustrates a pair of flanges or ferrules connected to the ends of respective fluid conveying members to be joined by the coupler, and an annular sleeve for sealing of the flanges/ferrules within the coupler.

Referring to the drawings, and particularly to FIGS. 1-4, a threadless, clamshell type coupling assembly or coupler is illustrated in a first embodiment, and is generally indicated at 10. The coupling assembly comprises a pair of coupling halves 12 that are connected to one another along hinge 14. Each of the coupling halves 12 terminate along respective longitudinally extending faces 15. These faces define the free ends of the coupling halves that are placed in a confronting position to close the coupling and to thereby secure confronting ends of the fluid conveying members 30. A latching mechanism 40 is provided to positively and selectively lock the coupling halves to one another in a closed or coupled position. As shown, the coupling halves 12 are curved or arcuate in shape, and traverse an arc of approximately 180°.

The threadless clamshell type coupling assembly illustrated is especially adapted for use in fluid conveying applications, such as low pressure aircraft fuel systems. However, it shall be understood that the latching mechanisms described herein with respect to various preferred embodiments are not limited to any particular fluid conveying application within a disclosed combination of a coupling assembly and a latching mechanism.

Figure 2:
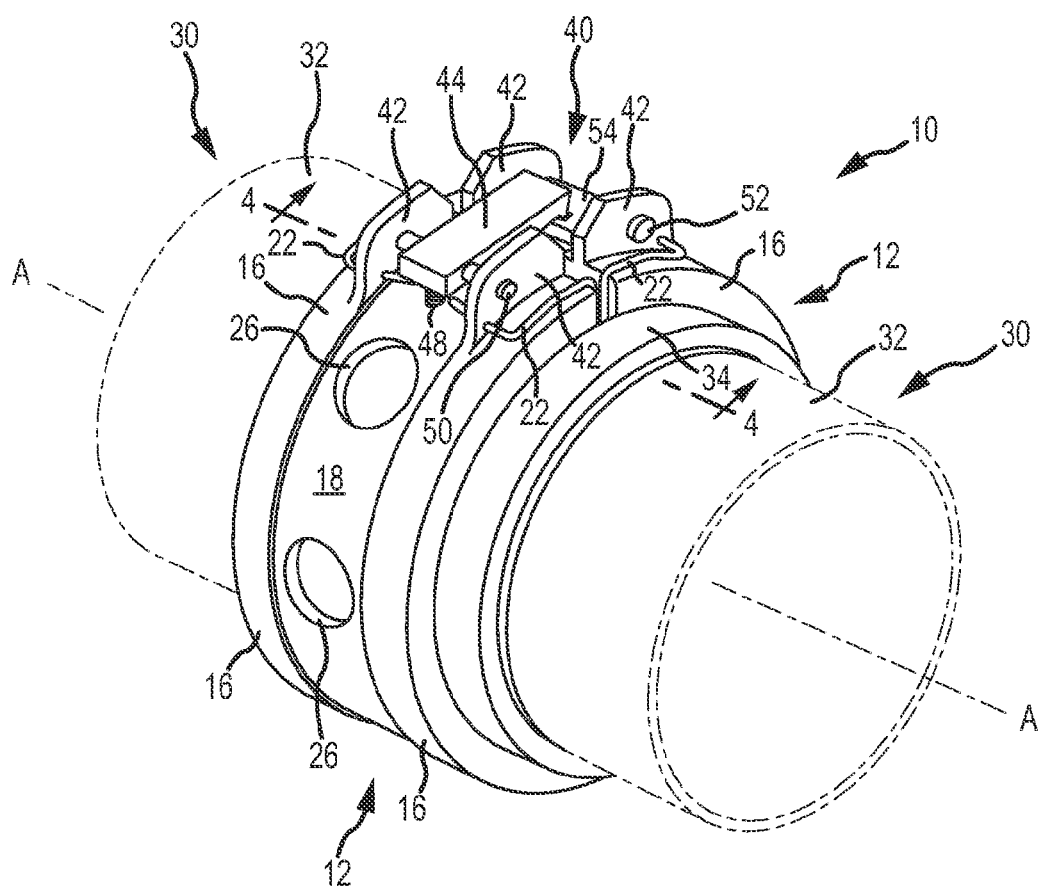
FIG. 2 is another perspective view of the embodiment of FIG. 1 showing the coupler placed in a coupled or closed position in which the flanges and sleeve are captured within the coupler thereby creating a fluid tight seal across the joined fluid conveying members.

The hinge 14 enables the coupling halves 12 to move relative to each other between a generally open or uncoupled position, such as shown in FIG. 1, and a generally closed or coupled position, such as shown in FIG. 2. The hinge 14 may be the same as disclosed in the Applicant's prior U.S. Pat. No. 8,075,024 or 6,880,859, these references being hereby incorporated herein for purposes of disclosing particular constructions for hinges used within clamshell type couplers.

The transverse ends or edges of the coupling halves 12 each include a shoulder 16 interconnected by a central web 18. The interior sides of the transverse ends each include a pair of closely spaced annular walls 20 defining a groove between the annular walls. Each of these grooves receives a portion of a bonding jumper or bonding wire 22. Each bonding wire 22 is a piece of conductive material that extends continually around the coupler, and extends continuously across the hinge 14 and across the latching mechanism 40. This continuous, electrically conductive bonding wire may also be the same as disclosed in the Applicant's prior U.S. Pat. No. 8,075,024 or 6,880,859 and these references being further incorporated herein for purposes of disclosing a particular construction for a bonding wire that may be used within the invention.

Figure 4:
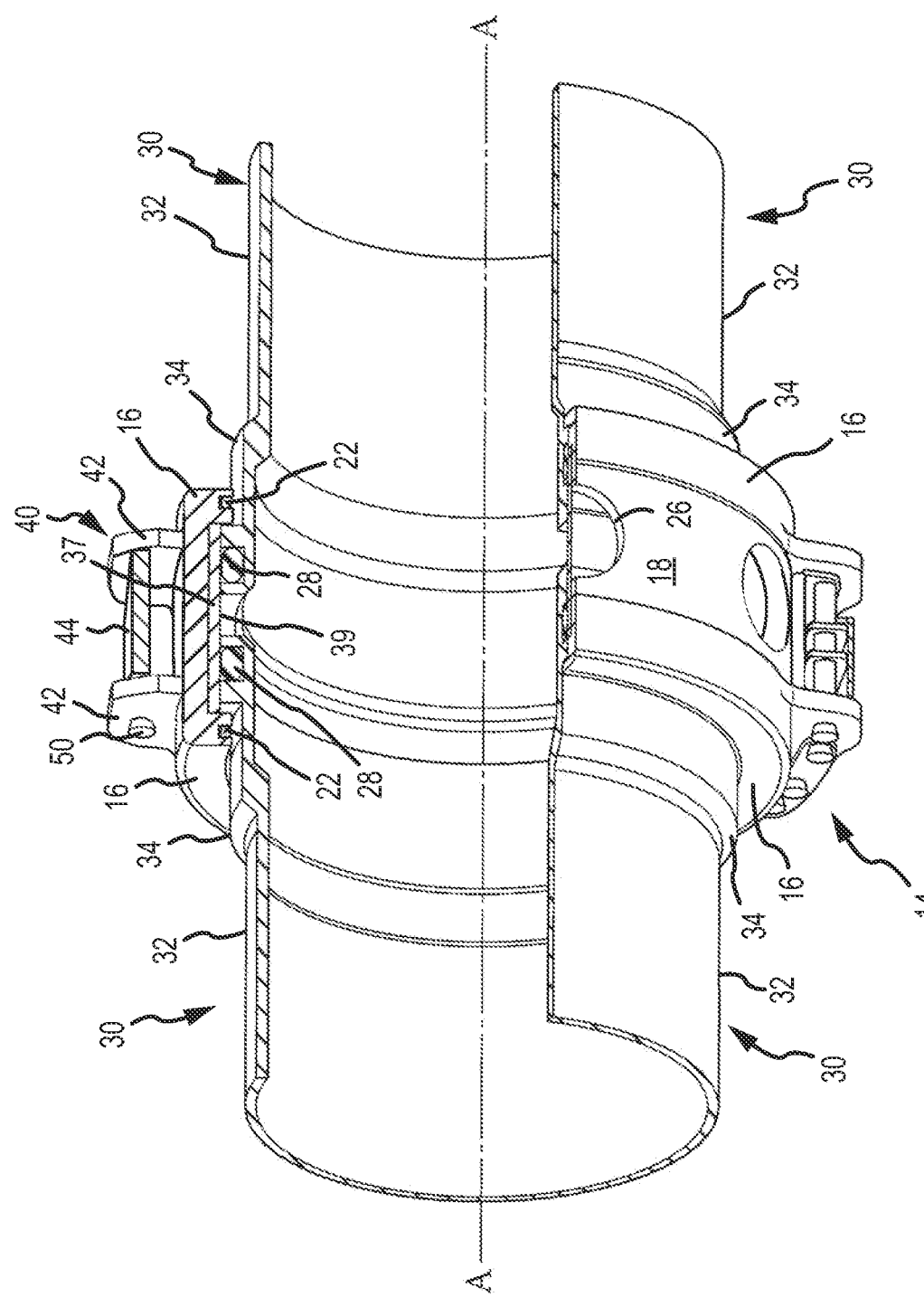
FIG. 4 is a fragmentary cross sectional view of the embodiment of FIG. 1 illustrating further details of the latching mechanism of the first embodiment, and the manner in which the coupler achieves a fluid tight seal across the facing ends of the fluid conveying members joined by the coupler.

One or more sight openings 26 may be formed in the coupling halves 12 to enable a user to view the connected relationship between the fluid conveying members 30, and to specifically confirm that the abutting flanges or ferrules 34 are properly joined to one another within the coupling assembly. Referring specifically to FIG. 4, the coupling assembly 10 is configured to connect confronting ends of the fluid conveying members 30. As shown, each fluid conveying member 30 includes fluid conveying elements in the form of a conduit or tube 32, with each fluid conveying member terminating with the flange or ferrule 34. When the coupling assembly is fully closed or coupled, a sleeve 37 spans between and resides over the distal ends of the ferrules 34. Each of the ferrules 34 includes an annular channel or groove 35 configured to receive an annular sealing member, such as an O-ring 28. The sleeve 37 is cylindrical in shape, and includes a smooth interior surface 39 that contacts the O-rings 28, thereby resulting in a seal created between the coupled sections of tubes.

In order to join the confronting ends of the fluid conveying members 30, the O-rings 28 are first placed within their respective grooves 35, and the ends of the fluid conveying members are moved to a confronting position as shown such that the sleeve 37 is installed over both of the O-rings 28. The coupler is then positioned so that the sleeve 37 is located within the web 18 of one of the coupling halves 12. The coupling halves are rotated relative to one another towards the closed or coupled position. The sleeve 37 is sized in length to span or bridge the space between the end faces of the ferrules 34 so that the interior surface 39 of the sleeve 37 peripherally surrounds and seats against the O-rings 28 as shown. It shall be appreciated that the grooves or channels 35 of each ferrule 34 are sufficiently sized to permit the annular sealing members or O-rings 28 to protrude radially beyond the outer surfaces of the ferrules 34. In this manner, the O-rings can be adequately compressed against the interior surface 39 of the sleeve 37 thereby establishing a fluid tight seal spanning across the facing ends of the ferrules 34. Optionally, the outer surfaces of the sleeves 37 maybe roughened to enable a user to better grip the sleeve in the course of assembling the sleeve 37 over the ferrules 34.

FIG. 4 further illustrates that the coupling assembly results in joining of the fluid conveying members 30 generally along a longitudinal axis A-A. However, the FIG. 4 also illustrates that the coupling assembly allows for some axial and angular adjustment between the ferrules 34 thereby allowing the ferrules 34 to be located anywhere between the maximum longitudinal extension of the sleeve 37, so long as the O-rings 28 are capable of making contact with the interior surface 39 of the sleeve 37. Accordingly, the ferrules 34 may be slightly spaced from one another as shown in FIG. 4, or the ferrules may be positioned so that the confronting faces 38 of the ferrules (see FIG. 1) make contact with one another within the sleeve 37. For angular adjustment between the ferrules 34, the diameter of the O-rings 28 may determine the extent to which the fluid conveying members can angularly extend away from or depart from alignment with the longitudinal axis A-A, yet the O-rings 28 still capable of providing a proper sealed relationship. As can be appreciated, the larger the O-rings 28 used, the greater angular displacement that may be achieved with the coupling assembly in joining fluid conveying members yet still maintaining a sealed connection between the joined fluid conveying members.

Figure 3:
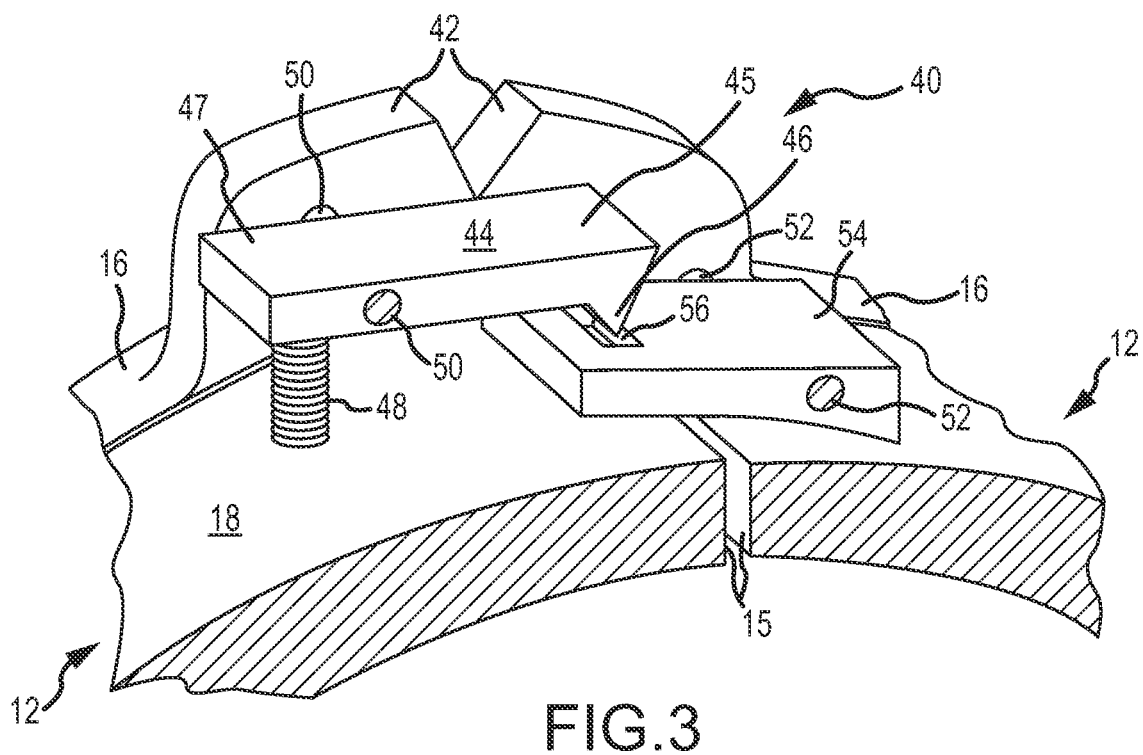
FIG. 3 is a greatly enlarged fragmentary perspective view of the coupler and the latching mechanism of the first embodiment of FIG. 1 illustrating additional details of the latching mechanism.

As best seen in FIG. 3, a latching mechanism 40 is illustrated in a first embodiment of the invention. The latching mechanism 40 includes a pair of latching mounts or brackets 42 that are disposed on the respective shoulders 16 of both coupling halves 12. The latching mounts 42 accommodate two functions; one function being to provide some lateral or transverse containment for the latch mechanism, thereby protecting the latch mechanism. The other function is to provide structure for mounting of elements or components of the latch mechanism 40. With respect to this latter function or purpose, it is shown that the latching mechanism 40 includes two major components, namely, a catch lever 44 and a latch plate 54 that are located between the latching mounts 42, and both of which are mounted to the latching mounts 42 by respective pins 50 and 52. A biasing member in the form of a spring 48 has one end secured to the web 18, and the other end secured to a proximal end 47 of the catch lever 44. In this arrangement, the catch lever 44 is urged so that the catch lever is rotated in a position so that the distal end 45 of the catch lever rotates towards the web 18. The latch plate 54 extends across the small gap between the faces 15 of the respective coupling halves 12. A distal end of the latch plate 54 has a cam opening 56 to receive a cam or extension 46 formed on the distal end 45 of the catch lever 44. As the distal end 45 of the catch lever 44 rotates toward the web 18, the extension 46 is securely placed within the opening 56. The size of the spring 48 and its distance to the rotation point about pin 50 can be selected so that sufficient force is provided for placing the coupling assembly in a locked position preventing inadvertent removal of the extension 46 within the opening 56. Further, the particular shape of the extension 46 can be selected so that it best maintains a locked relationship with the latch plate 54 when the coupling halves are fully rotated toward one another in a fully closed position. For example, the tip of the extension 46 may have a slight curvature or curl (not shown) that engages the interior surface of the latch plate 54 facing the web 18. In order to unlock the latching mechanism, the user places force against the proximal end 47 of the catch lever 44 in a direction toward the web. Alternatively, the user may pull on the distal end 45 with sufficient force to remove the extension 46 from within the opening 56.

Figure 5:
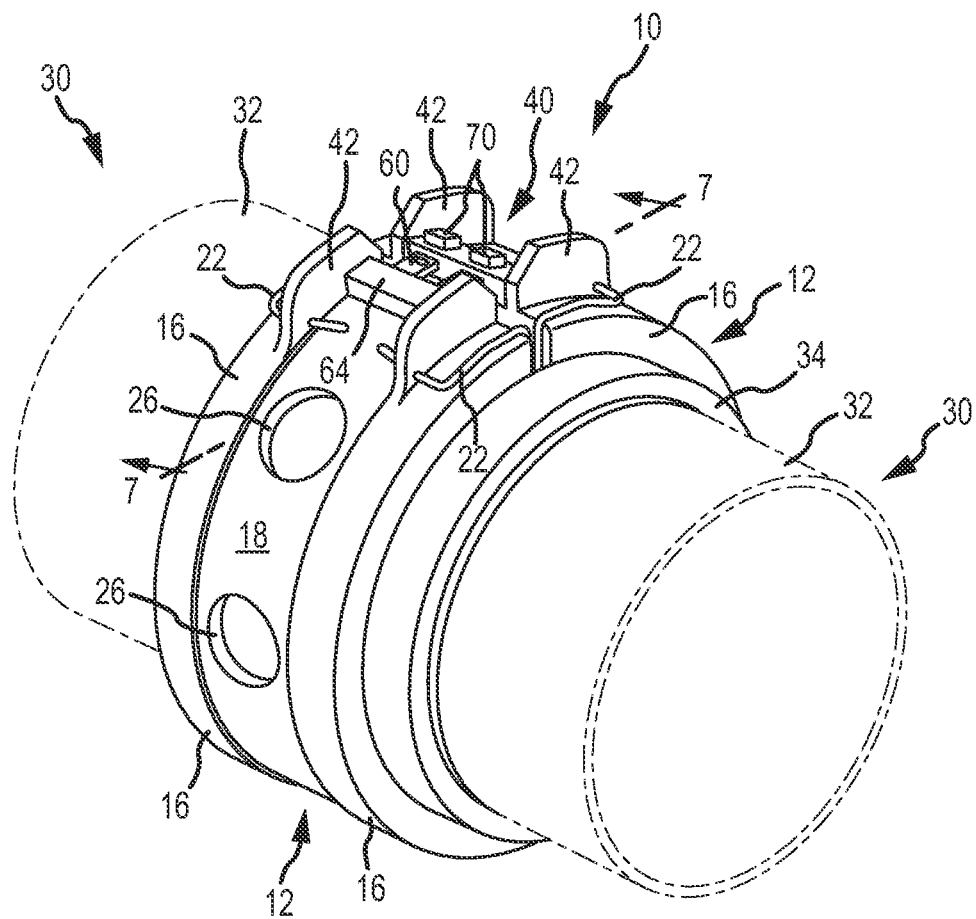
FIG. 5 is a perspective view of the clamshell type coupler and latching mechanism of the invention in a second embodiment with the coupler in the coupled or closed position.
Figure 6:
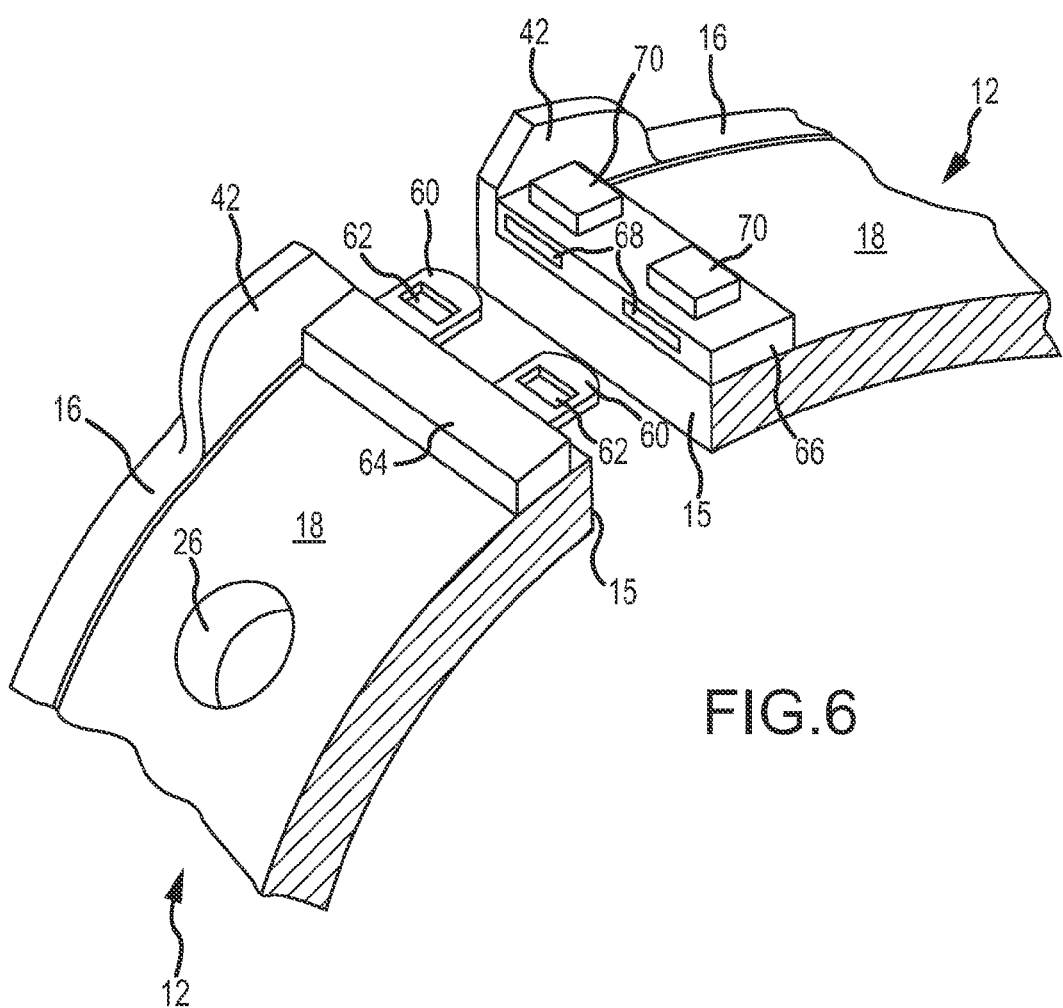
FIG. 6 is a greatly enlarged fragmentary perspective view of the coupler and the latching mechanism of the second embodiment illustrating additional details of the latching mechanism.
Figure 7:
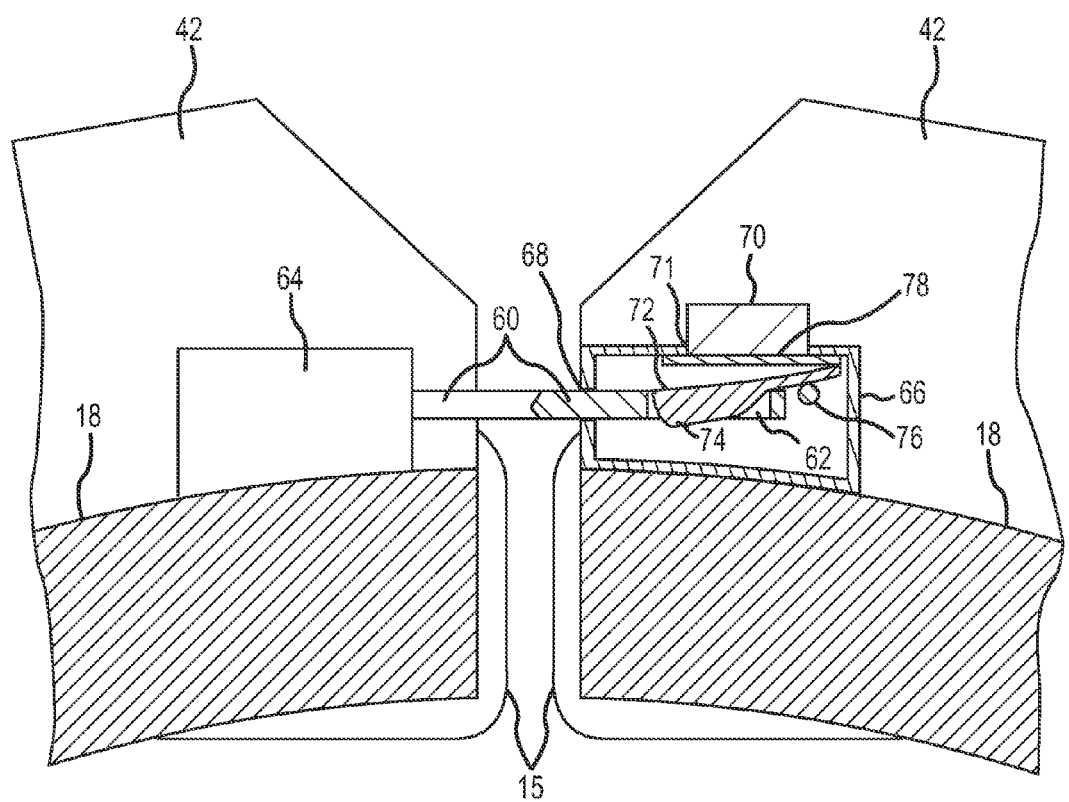
FIG. 7 is a greatly enlarged fragmentary cross section taken along line 7-7 of FIG. 5 illustrating further details of the latching mechanism.

Referring to FIGS. 5-7, a latching mechanism 40 is illustrated in a second embodiment. A general principle of operation for this embodiment is the use one or more spring-loaded buttons that can be used to positively engage and lock the coupling assembly. Referring to FIGS. 6 and 7, the latching mechanism 40 includes a base or mount portion 64 mounted to a first coupling half and located between the respective latching mounts 42. Two extensions or tongues 60 extend circumferentially beyond the face 15 of the first coupling half towards the second coupling half. A latching hole 62 is formed in each of the extensions 60 as shown. The second coupling half includes a latching housing 66 with a pair of latching openings 68 sized and oriented for receiving the extensions 60. Each of the openings 68 communicate with a biased locking button 70 that may be manipulated by the user to lock and unlock the latching mechanism. Referring specifically to FIG. 7, one particular construction for the biased locking button 70 and the latching housing 66 is shown, and which is similar to what is described in the U.S. Pat. No. 6,694,578. As illustrated, the locking button 70 extends through an opening 71 formed on the upper surface of the latching housing 66. A pressure plate 78 is attached to the lower surface of the button 70. A biased catch member 72 is mounted within and secured to the housing 66. In the configuration shown in FIG. 7, the biased catch member 72 acts as a leaf spring in order to provide a biased or spring-loaded catch to capture the extension 60. As a user depresses the button 70, the catch member 72 rotates about internal blocking pin 76 causing the distal end of the catch member 72 to rise, allowing the extension 60 to be fully inserted within the housing 66. Releasing the button 70 allows the catch member 72 to rotate back to its normal, lowered position within the housing 66. The catch member 72 has a flange or protrusion 74 that is sized to fit within the opening 62. Accordingly, force applied to the coupling assembly to open the coupling assembly is prevented by the flange 74 retained within the opening 62. In order to unlock the latching mechanism, the user simply presses on the button 70 and pulls the coupling halves apart. Providing a redundant pair of extensions 60 and corresponding locking buttons 70 provides further assurance that the coupling assembly will not become inadvertently unlocked.

Figure 8:
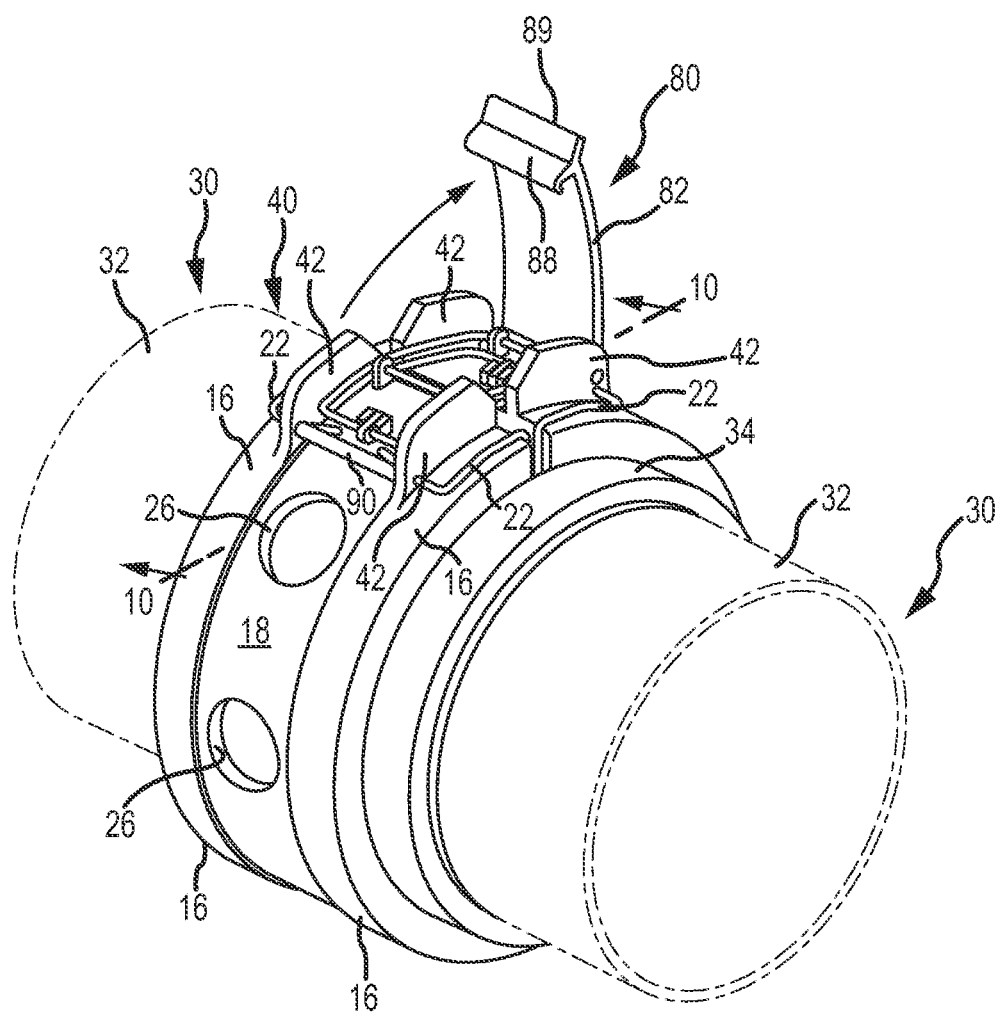
FIG. 8 is a perspective view of the clamshell type coupler and latching mechanism of the invention in a third embodiment with the coupler in the coupled or closed position, and further illustrating a latch indicator used to verify a proper locked position for the latch mechanism, the latch indicator shown in an open position.
Figure 9:
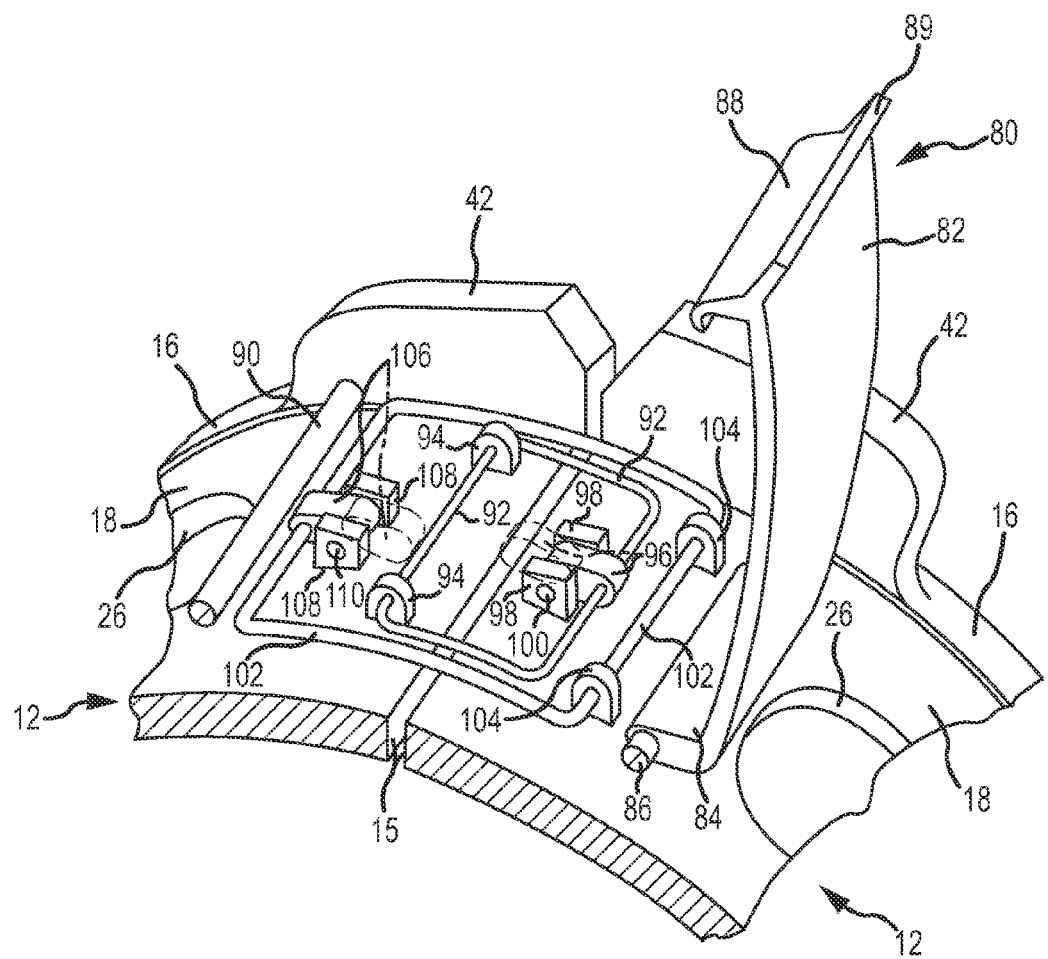
FIG. 9 is a greatly enlarged fragmentary perspective view of the coupler and the latching mechanism of the third embodiment illustrating additional details of the latching mechanism and latch indicator.
Figure 10:
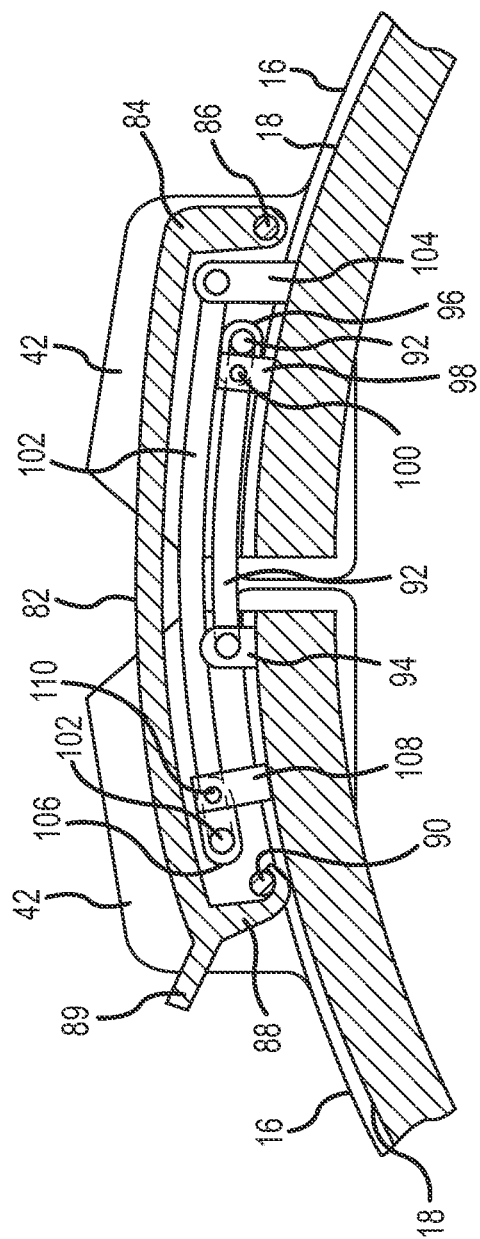
FIG. 10 is a greatly enlarged fragmentary cross section taken along line 10-10 of FIG. 8 illustrating further details of the latching mechanism and latch indicator of the third embodiment showing the latch indicator in a closed position.

Referring to FIGS. 8-10, another embodiment of the latching mechanism 40 of the invention is illustrated. These figures also illustrate use of a secondary latch mechanism or latch indicator 80. While some of the embodiments disclosed herein may not illustrate use of a latch indicator 80, it shall be understood that each of the embodiments may incorporate a latch indicator 80. The latch indicator 80 is not illustrated in some of the embodiments in order to simplify illustration of the various latching mechanisms 40. In general, this embodiment involves the use of two redundant trapeze type latching arms for locking the coupling assembly. A first trapeze latch group includes an inner latching arm 92, shown in the form of a rigid wire that is rotatably mounted to a pair of inner hinge mounts 94 located on one of the coupling halves. A free end of the inner latching arm 92 is rotatably secured to an inner latching cam 96 located on the other coupling half. The inner latching cam 96 itself is rotatably mounted about a pair of inner latching mounts 98 by inner latching pin 100. A second trapeze latch group includes the same general configuration as the first trapeze latch group, and this second group is mounted circumferentially around the first group. The second trapeze latch group more specifically includes a second outer latching arm 102, also shown in the form of a rigid wire, rotatably mounted to a pair of outer hinge mounts 104 located on one of the coupling halves. A free end of the outer latching arm 102 is rotatably secured to an outer latching cam 106 located on the other coupling half. The outer latching cam 106 is also rotatably mounted about a pair of outer latching mounts 108 by an outer latching pin 110. When the latching mechanism is placed in the unlocked position, the latching cams 96 and 106 are rotated toward one another, as shown in the dotted lines of FIG. 9. In this relationship, the coupling halves are allowed to be spread apart a distance defined by the respective distances between the points of rotation of the latching cams (about the respective pins 100 and 110), and the location where the latching arms attached to the latching cams. This distance may be selected such that the coupling halves may be suitably spread apart from one another in an open position to enable the sleeve 37 and ferrules 34 to be inserted within the interior of the coupling without undue difficulty. In order to lock the latching mechanism, the latching cams 96 and 106 are rotated away from one another, and downward against the web 18. A degree of rotation is provided so that the latching cams may be rotated beyond horizontal, thereby taking advantage of a locking arrangement in which additional force is required to reverse rotate the locking cams to an unlocked position. As also illustrated best in FIG. 9, the inner and outer latching arms each include respective pairs of spaced latching arm extensions that extend across the gap between the facing ends 15 of the coupling halves 12. These latching arm extensions can be defined as the straight sections of the latching arms that are oriented substantially parallel to one another and which extend in a direction to traverse the gap. As also shown in this preferred embodiment, the inner latching arm is disposed within an area bounded by the outer latching arm. This nested arrangement between the latching arms is a space saving configuration in which redundancy is provided by two elements for locking of the latching mechanism. Further, FIG. 9 illustrates a reverse mounting arrangement between the inner and outer latching arms in which one latching cam is located on both coupling halves.

For the secondary latch mechanism or latch indicator 80, this indicator provides verification that the coupling assembly is properly secured in a closed or coupled position by the corresponding latching mechanism 40. As shown, the latch indicator 80 includes a mounting flange or base 84 with a mounting pin 86 enabling the latch indicator 80 to be rotated between an open position as shown in FIG. 9, and a closed position as shown in FIG. 10. The latch indicator 80 further includes a body 82 having a width that extends substantially across the gap between the opposing pairs of latching mounts 42. The free or distal end of the body 82 includes a curved latching projection 88. This distal end also includes a release tab 89. When the latching mechanism 40 is placed in its locked position, the latch indicator may be moved to its closed position in order to confirm that the latching mechanism has been properly locked, and also to provide protection for the latch mechanism. Referring specifically to FIG. 10, the latch indicator 80 is rotated downward such that the latching projection 88 is frictionally engaged around the latch pin 90. The latch pin 90 is selectively positioned such that the latching projection 88 cannot be engaged with the latch pin 90, unless the latching mechanism 40 is properly locked, as defined with the coupling halves being positioned at a set location between one another. For example, if the latching mechanism 40 is not properly locked, this will result in the coupling halves being spread apart too far from one another or too close to one another. In the first circumstance, when the user makes an attempt to close the latch indicator 80, the latching projection 88 will not extend far enough to reach the latch pin 90. In the second circumstance, when the user closes the latch indicator 80, although the latching projection 88 may be positioned far enough to reach the latch pin 90, the latching projection 88 will not adequately engage the latch pin 90 allowing the latch indicator to be freely opened without resistance against the latch pin. When the latching mechanism 40 is properly locked, the latch indicator 80 can be closed resulting in contact of the latching projection 88 against the latch pin 90, with an audible "click" indicating a proper closed position for the latch indicator. In general, the latch indicator 80 therefore serves as both a visual and tactile indicator used to verify that the coupling assembly is properly installed and secured over the connected fluid conveying members. Preferably, the latch indicator may be constructed of a suitable material to prevent any chance of a spark gap occurrence, as may be required by the applicable regulations for which the latch mechanism is intended to be used. One example of material that can be used includes a thermoplastic organic polymer, such as polyetheretherketone (PEEK). Alternatively, the latch indicator 80 could be constructed of a conductive metallic material.

Figure 11:
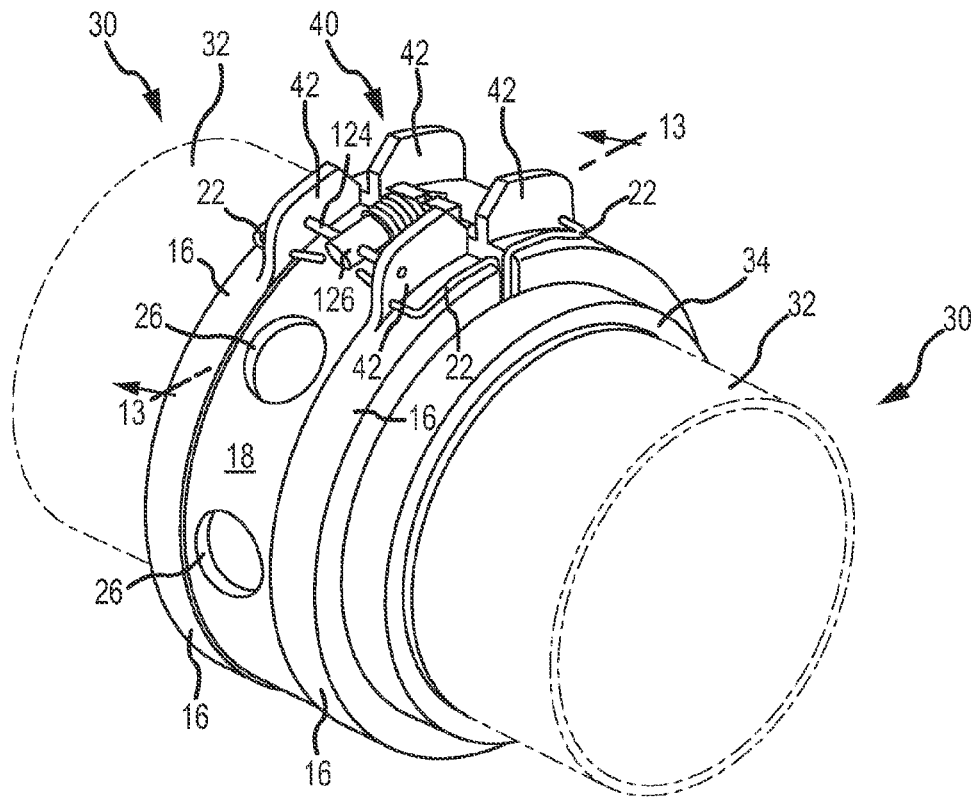
FIG. 11 is a perspective view of the clamshell type coupler and latching mechanism of the invention in a fourth embodiment with the coupler in the coupled or closed position.
Figure 12:
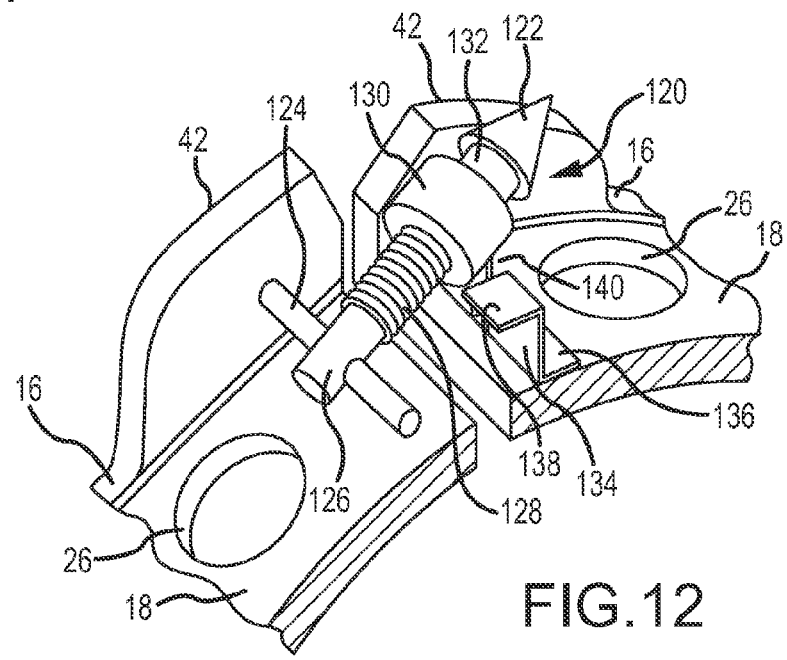
FIG. 12 is a greatly enlarged fragmentary perspective view of the coupler and the latching mechanism of the fourth embodiment illustrating additional details of the latching mechanism.
Figure 13:
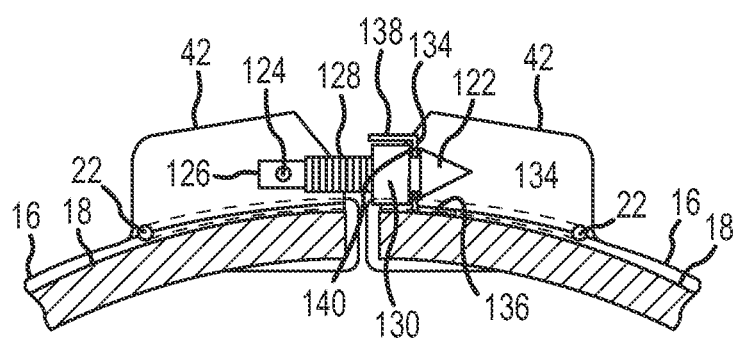
FIG. 13 is a fragmentary cross section taken along line 13-13 of FIG. 11 illustrating further details of the latching mechanism.

Referring to FIGS. 11-13, a fourth embodiment is illustrated for the latch mechanism 40. This embodiment is characterized by a single latching arm 120 rotatably mounted on a pin 124 that traverses between adjacent latching mounts 42. The latching arm 120 includes a central rod or core 126, with a proximal end thereof having an opening to receive the mounting pin 124. A retention spring 128 is placed over the distal end of the central rod 126, and resides between the proximal end of the central rod 126 and a movable bushing 130 mounted over the central rod 126 distally of the spring 128. A spacer 132 is also placed over the distal end of the central rod 126, and resides distally of the movable bushing 130. A head or cap 122 attaches to the distal end of the rod 126. The movable bushing 130 may be selectively slid proximally along the central rod 126, thereby compressing the spring 128. The normal, biased position of the movable bushing 130 is shown in FIG. 12, in which the movable bushing 130 abuts the spacer 132. The spacer 132 defines a gap or space enabling the distal free end of the latching arm to be placed in a locked position. More specifically, a locking bracket 134 is mounted on the other coupling half as shown, the bracket 134 having a reverse "S" shape in cross-section. A base portion 136 of the bracket is mounted to the web 18 of the coupler. The upper portion 138 of the bracket 134 includes a slot 140 for receiving the spacer 132 when the latching arm 120 is rotated downward. First, movable bushing 130 is refracted, thereby generating an additional gap between the proximal end of the spacer 132 and the distal end of the bushing 130. Referring also to FIG. 13, after the spacer 132 has cleared the upper portion 138 of the bracket 134, the spacer is allowed to proceed further into the slot 140 that extends along the vertical portion of the bracket 134. At this position, the movable bushing 130 can be released, and the bushing 130 is therefore urged in contact against the vertical portion of the bracket 134, thereby locking the latching mechanism. As also shown in FIG. 13, the movable bushing 130 is sized so that it fits snugly within the gap between the upper portion 138 of the bracket 134 and the surface of the web 18. In this configuration, the spring force provided by the retention spring 128 and the size of the movable bushing 130 located in the gap provides for a reliable locking connection. In order to unlock the latching mechanism, force is applied to the movable bushing 132 to compress the spring 128, and the latching arm 120 can be rotated away from the bracket 134 when the bushing 132 has been retracted enough to clear the bracket 134.

Figure 16:
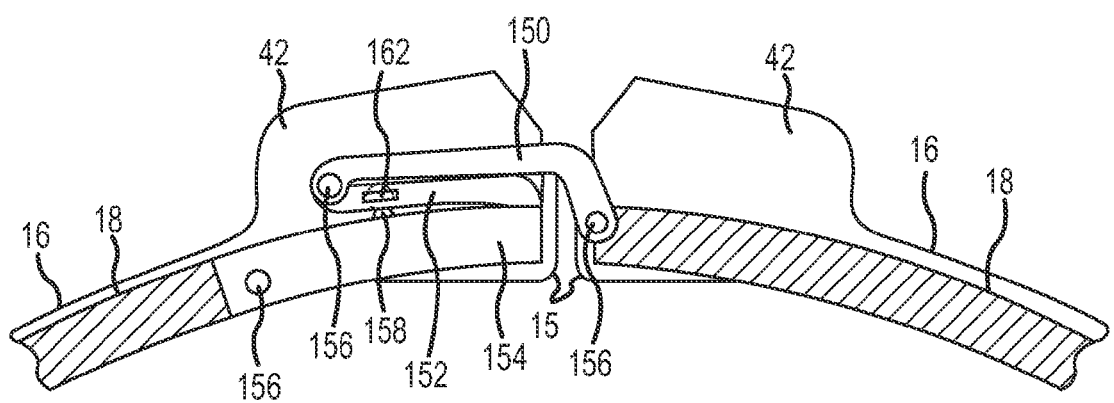
FIG. 16 is a greatly enlarged fragmentary cross section taken along line 16-16 of FIG. 14 illustrating further details of the latching mechanism.

Referring to FIGS. 14-16, the latching mechanism 40 is illustrated in a fifth embodiment. This embodiment may be generally characterized as an over-center latching configuration in which two movable latching plates are simultaneously rotated over a stationary base plate and secured against the base plate to place the coupling assembly in a closed or coupled position. More specifically, referring especially to FIG. 15, the latching mechanism 40 includes a first latch plate 150 having a first end rotatably connected to one of the coupler halves by a hinge 156. A second latch plate 152 has a first end rotatably connected to the other coupling half by another hinge 156. The second ends of the first and second latch plates are rotatably connected to one another along another hinge 157. Referring also to FIG. 14, a stationary base plate 154 is attached to a distal end of the corresponding coupling half 12. As shown, the base plate may have a first end rotatably attached to yet another hinge 159 secured to the web 18. A second end of the base plate 154 rotatably attaches to the first end of the second latch plate 152. In an open position, the first ends of the first and second latch plates are separated from one another, thereby expanding the gap between the facing ends of the coupler halves. In order to close and lock the latching mechanism, the first ends of the latch plates 150 and 152 are drawn toward one another, and are simultaneously folded over the base plate 154. FIGS. 14 and 15 illustrate the first and second latch plates in a partially folded orientation. The second latch plate 152 further includes an opening 160, and the base plate 154 further includes a locking ball 158 that aligns with the opening 160 such that when the first and second latch plates are fully rotated over the base plate 154, the locking ball 158 is inserted within the opening 160. As can be appreciated, once the first and second latch plates have been fully rotated, the position of the locking ball 158 within the opening 160 prevents the latch plates 150 and 152 from being rotated to an unlocked position without some force being applied. Further, the particular shape of the opening 160 can be provided so that, in order to align the locking ball 158 with the opening 160, the coupler halves must be rotated slightly beyond an optimal closed position. Referring specifically to the greatly enlarged fragmentary plan view of the opening in FIG. 14A, the head portion of the locking ball 158 is first received within the opening 160, and as pressure on the coupling halves is released, the neck or smaller diameter portion of the locking ball 158 travels within a slot 164 that communicates with the opening 160. In this configuration, the latching mechanism holds the coupler halves in an optimal closed or coupled position. An additional feature that may assist in maintaining the coupler halves in the closed position includes the provision of a key 162 located on the lateral side of one or both of the movable latch plates 150/152 and a corresponding keyway or slot 163 formed on the other movable latch plate. In the locked position of the latching mechanism, the key 162 and keyway 163 align, thereby providing an additional element to prevent the latching mechanism from inadvertently opening.

Figure 17:
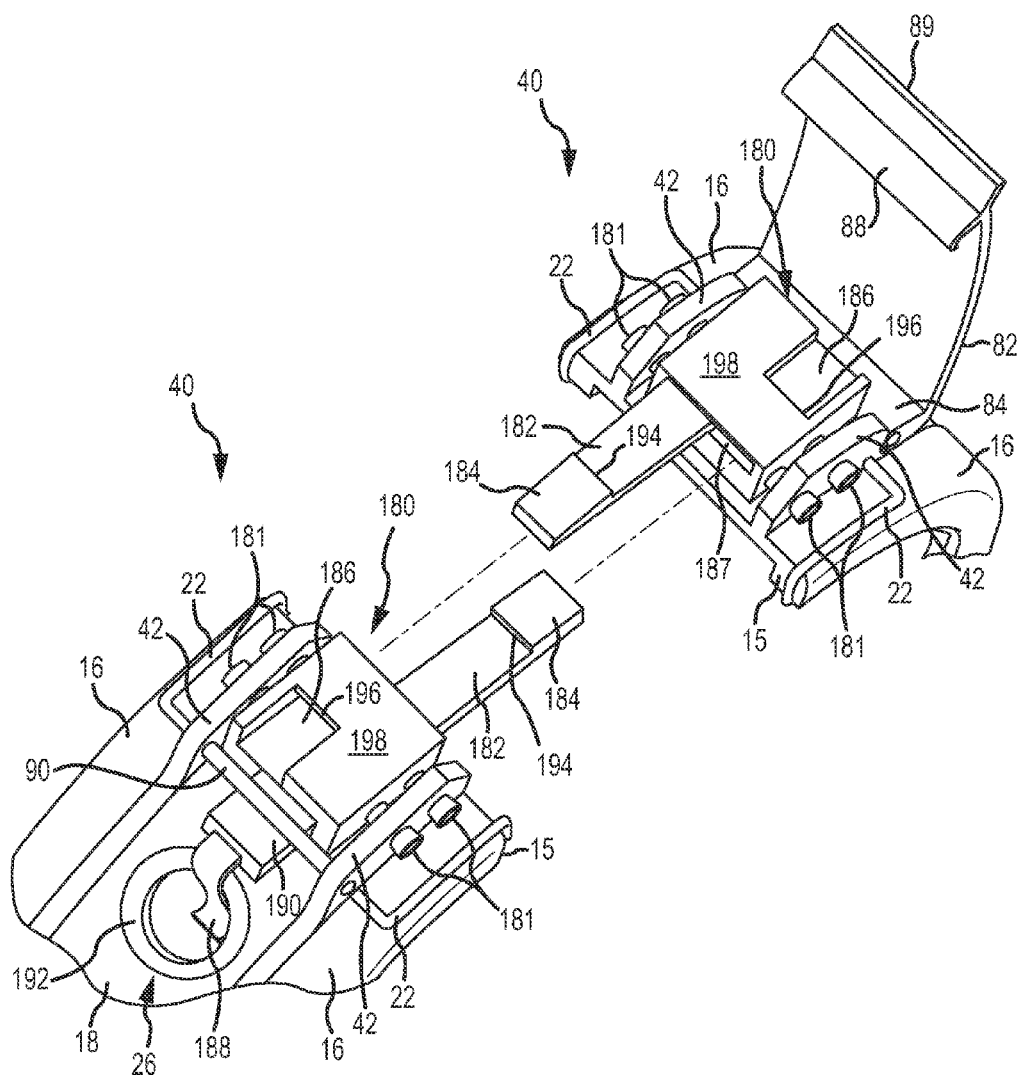
FIG. 17 is a greatly enlarged fragmentary perspective view of the coupler a latching mechanism and latch indicator in a sixth embodiment, showing the latching mechanism in an unlocked position and the latch indicator in an open position.
Figure 18:
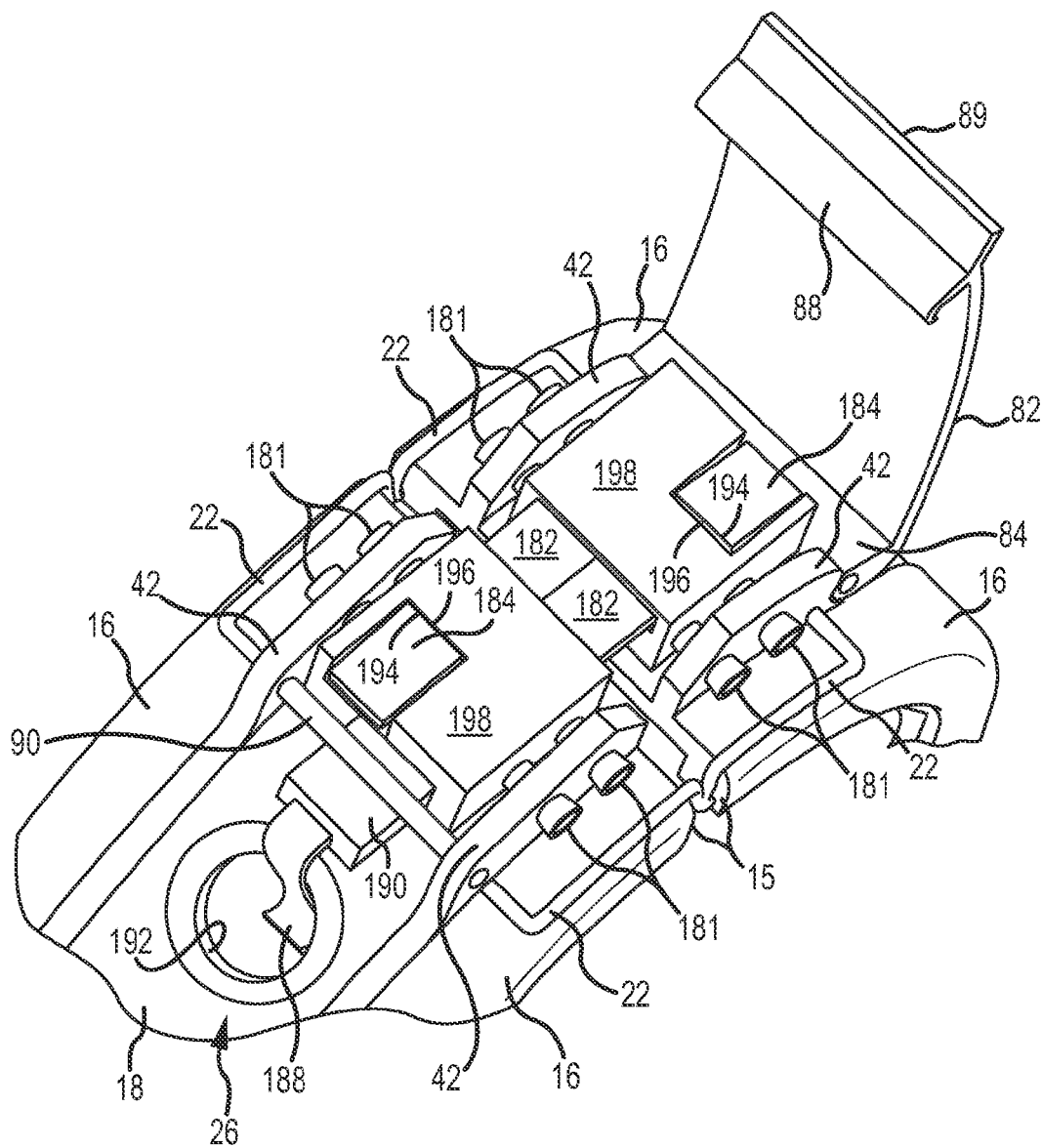
FIG. 18 is another greatly enlarged fragmentary perspective view of the coupler and the latching mechanism of the sixth embodiment, showing the latching mechanism in a locked position and the latch indicator remaining in the open position.
Figure 19:
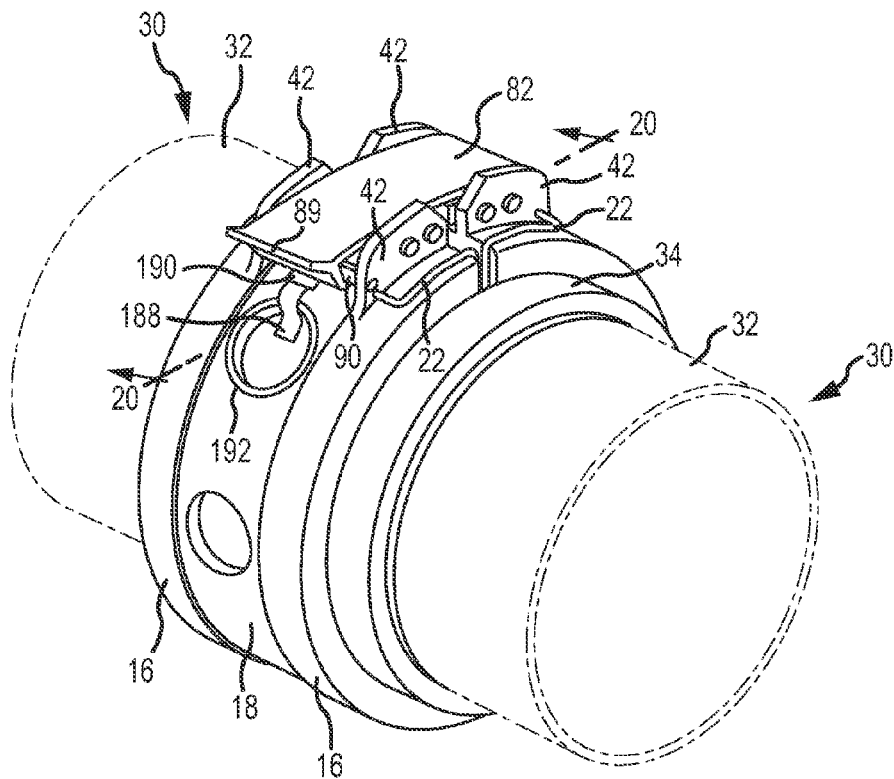
FIG. 19 is a perspective view of the clamshell type coupler and latching mechanism of the sixth embodiment with the coupler in the coupled or closed position and the latch indicator in a closed position.
Figure 20:
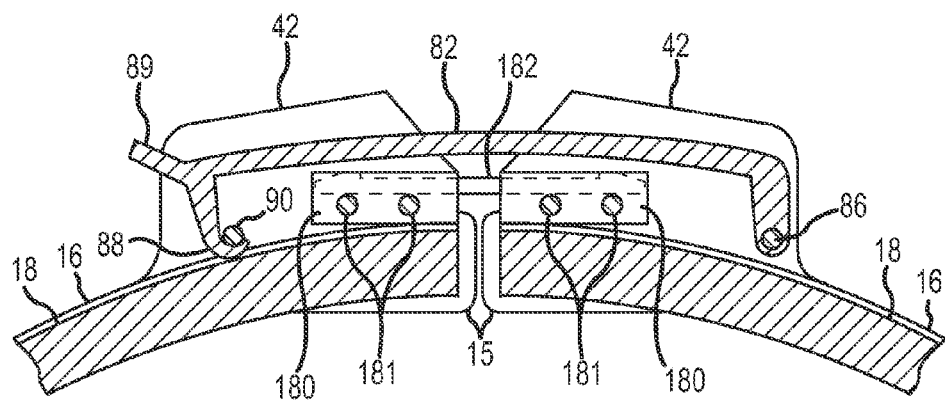
FIG. 20 is a greatly enlarged fragmentary cross section taken along line 20-20 of FIG. 19 illustrating further details of the latching mechanism.

Referring to FIGS. 17-20, the latching mechanism 40 is illustrated in a sixth embodiment. This embodiment can be generally characterized as including a pair of cassette connectors each having biased connector extensions for locking the facing ends of the coupler halves to one another. First referring to FIG. 17, the latching mechanism 40 is illustrated in which two mirror image cassette connectors 180 are provided, one mounted to each end of the respective coupler halves. As shown, one or more mounting pins 181 are used to mount the cassette connectors 180 between the latching mounts 42. Each cassette connector has a main body portion 198 with a connector extension 182 extending toward the opposing cassette connector 180. The main body portion 198 further includes a receiving slot 186 and an opening 187 that communicates with the slot. The opening 187 extends through main body portion 181 and terminates where the slot 186 is exposed. FIG. 18 illustrates the latching mechanism in a closed and locked position in which the connector extensions 182 are inserted through the opposing receiving slots 186. Each of the connector extensions 182 include a retention tab 184 that is sized to fit within a receiving slot 186. According to the views of FIGS. 17 and 18, the connector extensions 182 extend from their corresponding bodies 198 in a slightly upward direction so that when the tabs 184 clear the openings 187 and are placed in the slots 186, the tabs 184 have proximal surfaces 194 that biasingly engage corresponding catch surfaces 196 of the slots 186. In order to unlock the latching mechanism, both of the retention tabs 184 must be simultaneously pressed downward, so that the tabs 184 clear the catch surfaces 196 of the slots 186 as the coupling halves are rotated away from one another.

In addition to the bonding wires that may be used to electrically couple the elements of the fluid conveying members and coupling assembly thereby preventing potential electrostatic buildup, the latching mechanisms may be provided with further conductive elements, shown in FIG. 17 as a bonding extension 190, a bonding spring 188 connected to the extension 190, and a conductive insert 192 placed within the opening 26. Assuming the coupling halves are adequately conductive, it is not required to provide the insert 192 however, the insert 192 along with the bonding spring 188 and bonding extension 190 can in any event be used to further electrically tune the coupling assembly in order to optimally dissipate electrostatic charges.

According to methods of the invention, each of the latching mechanisms embodiments also include respective methods of interconnecting fluid conveying members and selectively sealing and closing a joint or connection between the fluid conveying members so that a fluid tight seal is achieved across the joint or connection. In general, the methods include providing a coupling assembly, such as a clamshell type coupler, and providing hardware configurations on the ends of the fluid conveying members to be joined, such as respective ferrules, sealing members (O-rings), and a sleeve extending between the ferrules. The methods further include capturing the ends of the fluid conveying members and hardware within the coupler, and rotating or translating the coupler to a closed position around the fluid conveying members so that the free ends of the coupling halves are aligned and are placed close to or in contact with one another. Further steps in the methods relate to the various embodiments of the latching mechanisms and the manner in which selective locking features are provided to positively and selectively lock and unlock the latching mechanisms.

According to one method of the invention, a latching mechanism includes a catch lever that cooperates with a latch plate to selectively lock and unlock the latching mechanism. The catch lever is mounted on one of the coupling elements, and is biased to rotate in a manner to engage an opening in the latch plate. The latch plate is mounted on the other coupling element, and may also be rotatable to best align the latch plate with the catch lever, thereby locking the latching mechanism in place.

According to another method of the invention, a latching mechanism includes at least one tongue or extension extends from a base mounted to one of the coupling elements, and a latching housing is mounted to the other coupling element, with an opening to receive the extension. The latching housing further includes a biased locking button communicating with the opening, enabling a user to selectively lock and unlock the extension within the opening thereby placing the latching mechanism in a corresponding locked or unlocked position. In one preferred embodiment, the method incorporates at least a pair of extensions received in corresponding openings of the latching housing.

According to another method of the invention, a latching mechanism includes inner and outer latching arms that extend across the gap between the facing ends of coupling elements. Each of the latching arms are rotatably mounted to one of the coupling elements. A free or latching end of each of the latching arms is secured to the other coupling element in a locking cam configuration such that the latching arm can be moved between a first unlocked position to a second locked position that draws the ends of the coupling elements toward one another, thereby locking the latching mechanism. The locking cam configuration includes a latching cam secured to the latching arm, and the latching cam itself being rotatably mounted to the coupling element. According to one embodiment, the inner and outer latching arms are reversed mounted on the coupling elements, namely, the inner latching arm has its corresponding latching cam secured to one of the coupling elements, and the outer latching arm has its corresponding latching cam secured to the other coupling element. This interlocking mounting of the latching arms provides for redundancy in achieving a locked position for the latching mechanism.

According to another method of the invention, a latching mechanism includes a latching arm rotatably mounted to one coupling element, and a bracket mounted to the other coupling element which receives the latching arm when the latching arm is rotated towards the bracket. The bracket includes a slot configured to receive the free or distal end of the latching arm. The latching arm includes a spring biased bushing that can be selectively slid or translated along a central rod of the latching arm. To lock the latching mechanism, the latching arm is rotated to engage the bracket in which the bushing is retracted along the central rod, enabling the distal end of the latching arm to be inserted within the slot of the bracket. The bushing is then released to make frictional engagement with a facing surface of the bracket. To unlock the latching mechanism, the bushing is again retracted, and the latching arm is rotated away from the bracket.

According to another method of the invention, a latching mechanism includes first and second cooperating latch plates that are rotated simultaneously, and are then engaged with a base plate, thereby placing the latching mechanism in a locked position. The first and second latch plates each have a first end mounted to respective ends of the coupling elements. The second ends of the first and second latch plates are rotatably connected to one another. Upon rotation of the first and second latch plates towards the base plate, this results in drawing the ends of the coupling elements toward one another. A locking feature is provided to maintain the latching mechanism in a locked position. According to a preferred embodiment, the locking feature includes a locking ball mounted to and extending from the base plate, and a locking opening or slot formed on the first or second latch plate that receives the locking ball when the first and second latch plates have been rotated towards the base plate. To unlock the latching mechanism, force is applied to the joined ends of the first and second latch plates to overcome the frictional connection between the locking ball and locking opening/slot.

According to another method of the invention, a latching mechanism includes a pair of cooperating cassette connectors, one connector mounted on each end of the coupling elements to be joined. According to a preferred embodiment, each cassette connector includes a connector extension with a tab formed on the free or distal end of the extension. Each connector further includes a receiving opening and receiving slot formed in the connector and positioned adjacent the connector extension. The receiving slot is a continuation of the receiving opening with a surface of the cassette body removed to expose the slot. To place the latching mechanism in a locked position, the connector extensions are inserted within the facing receiving openings of the other cassette connector, and the tabs snap into engagement with catch surfaces of the receiving slots. The connector extensions are oriented so they can be inserted within the receiving openings when the coupling elements are positioned close to or in contact with one another. The connector extensions rotate upwards or radially outward away from the latching mechanism once the tabs clear the openings and enter receiving slots, thereby generating an audible/tactile "click". To unlock the latching mechanism, the tabs are pressed downward, enabling the tabs to clear the corresponding catch surfaces. The coupling elements may then be separated from one another as the connector extensions are removed from within the receiving slots and openings.

Each of the methods of the invention may further include a latch indicator feature in which a latch indicator element may be used in conjunction with the latching assemblies to verify that the coupling assembly is properly installed and secured over the fluid conveying members. In a preferred embodiment, the latch indicator may include a rotatable latching body having a latching projection formed on the free or distal end thereof. The latching projection frictionally engages and attaches to a latch pin when the latching body is rotated in a closed position. If the latching projection of the latching body is unable to reach the latch pin, this indicates that the coupling elements have not been drawn close enough to one another, which may be an indication that there is some misalignment between the fluid conveying members. If the latching projection is able to reach the latch pin, but extends beyond the latch pin such that there is no frictional engagement with the latch pin, this indicates that the coupling elements have been drawn too close to one another, and again this may indicate misalignment between the fluid conveying members. Upon occurrence of an improper closing of the latching projection over the latch pin, a user can inspect the fluid conveying members and the coupling assembly to troubleshoot the reason why the connection or joint has not been properly made.

The coupling assembly described herein as a number of advantages. Each of the embodiments of the respective latching assemblies or mechanisms provides structural redundancy for selectively locking and unlocking the latching assemblies. This structural redundancy is provided within simple yet robust components that provide reliable and easy-to-use ways to lock and unlock the latching assemblies. The latching mechanisms employ bonding elements that achieve the necessary conductivity across the coupling assembly to eliminate the possibility of build-up of electrostatic charges. The addition of a latch indicator ensures that the coupling assembly is properly assembled and that the latching mechanism is properly installed over the ends of the fluid conveying members, thereby preventing inadvertent leakage of fluid. The latch indicator also serves to protect the latching mechanism.

The invention has been set forth with respect to preferred embodiments of both latching mechanisms and methods related to installing and using the latching mechanisms. The disclosure of the preferred embodiments is not intended to restrict or otherwise limit the scope of the claimed invention. Therefore, it should be understood that the details disclosed in the preferred embodiments can be modified within the scope of the appended claims. Further, the preferred embodiments are illustrative, and no single feature or element is essential to all possible combinations that may be claimed herein.

What is claimed is:

1. A coupling including a latching mechanism for selectively locking and unlocking the coupling used to interconnect ends of two fluid conveying members, said coupling comprising:
   a first coupling member;
   a second coupling member rotatable attached to said first coupling member;
   a base mounted to said first coupling member of said coupling;
   a tongue extending from said base towards said second coupling member of said coupling;
   a latching housing mounted to said second coupling member, said latching housing having an opening for receiving said tongue, said latching housing further including a locking button attached to said latching housing, and a biased catch member communicating with said locking button;
   a pair of latching mounts mounted on at least one of said first or second coupling members and said base or said latching housing placed between said pair of latching mounts, said pair of latching mounts for providing lateral containment of said base or said latching housing; and
   wherein said tongue extends across a gap between facing surfaces of said first and second coupling members when said coupling is placed in a closed position about said fluid conveying members, said latching mechanism placed in a locked position by placing said tongue through said opening of said latching housing and contacting said biased catch member, said latching mechanism placed in an unlocked position by pressing said locking button and simultaneously removing said tongue from within said latching housing.

2. A coupling, as claimed in claim 1, wherein:
said tongue includes a pair of tongues, said opening includes a pair of openings, and wherein one tongue is placed in an opening, and the other tongue is placed in the other opening.

3. A coupling, as claimed in claim 1, wherein:
said locking button includes a locking plate attached thereto and disposed within said latching housing, said locking plate contacting said biased catch member such that when said locking button is depressed, said biased catch member moves away from said tongue, and when said locking button is released, said biased catch member moves toward said tongue.

4. A coupling, as claimed in claim 1, wherein:
said tongue has a latching hole located on a distal portion of said tongue, said biased catch member has a protrusion formed thereon, and wherein said protrusion of said biased catch member is inserted within said latching hole, thereby preventing the first and second coupling members from being separated from one another when said latching mechanism is in the locked position.

5. A method of selectively locking and unlocking a latch mechanism of a coupling used to interconnect facing ends of two fluid conveying members, said method comprising:
providing a first coupling member a second coupling member rotatably attached to said first coupling member, and a pair of latching mounts mounted on at least one of said first or second coupling members;
providing a latch mechanism including (i) a base mounted to a first coupling member of said coupling (ii) a tongue extending from said base towards a second coupling member of said coupling (iii) a latching housing mounted to said second coupling member, said latching housing having an opening for receiving said tongue (iv) a locking button attached to said latching housing, and (v) a biased catch member disposed in said latching housing and communicating with said locking button;
placing the ends of the two fluid conveying members within said coupling;
closing said coupling about the ends of the two fluid conveying members to thereby orient said coupling in a closed position;
said tongue extending across a gap between facing surfaces of said first and second coupling members when said coupling is placed in the closed position locking said latching mechanism by placing said tongue through said opening of said latching housing and contacting said biased catch member; and
unlocking said latching mechanism by pressing said locking button and simultaneously removing said tongue from within said latching housing; and
wherein said base or said latching housing is located between said pair of latching mounts, said pair of latching mounts for providing lateral containment of said base or said latching housing.

\* \* \* \* \*

UNITED STATES PATENT AND TRADEMARK OFFICE
CERTIFICATE OF CORRECTION

| | | |
|---|---|---|
| PATENT NO. | : 9,261,211 B2 | Page 1 of 1 |
| APPLICATION NO. | : 14/052476 | |
| DATED | : February 16, 2016 | |
| INVENTOR(S) | : Nicholas Clancy Schooley et al. | |

It is certified that error appears in the above-identified patent and that said Letters Patent is hereby corrected as shown below:

In the claims

At Column 16, line 40, delete "rotatable" and insert -- rotatably --; and

At Column 17, line 25, following "a first coupling member" insert -- , --.

Signed and Sealed this
Tenth Day of May, 2016

Michelle K. Lee
*Director of the United States Patent and Trademark Office*